US011480034B2

(12) United States Patent
Ogg et al.

(10) Patent No.: US 11,480,034 B2
(45) Date of Patent: Oct. 25, 2022

(54) OVERPRESSURE PROTECTION APPARATUS

(71) Applicant: National Oilwell Varco, L.P., Houston, TX (US)

(72) Inventors: Jeremy L. Ogg, Houston, TX (US); Andrew Kadavy, Houston, TX (US)

(73) Assignee: NATIONAL OILWELL VARCO, L.P., Houston, TX (US)

( * ) Notice: Subject to any disclaimer, the term of this patent is extended or adjusted under 35 U.S.C. 154(b) by 110 days.

(21) Appl. No.: 16/957,437

(22) PCT Filed: Dec. 20, 2018

(86) PCT No.: PCT/US2018/066777
§ 371 (c)(1),
(2) Date: Jun. 24, 2020

(87) PCT Pub. No.: WO2019/126487
PCT Pub. Date: Jun. 27, 2019

(65) Prior Publication Data
US 2021/0071503 A1   Mar. 11, 2021

Related U.S. Application Data

(60) Provisional application No. 62/635,925, filed on Feb. 27, 2018, provisional application No. 62/609,478, filed on Dec. 22, 2017.

(51) Int. Cl.
*G05D 16/20* (2006.01)
*E21B 41/00* (2006.01)
(Continued)

(52) U.S. Cl.
CPC ............ *E21B 41/0021* (2013.01); *F16K 3/00* (2013.01); *F16K 17/18* (2013.01); *G05D 16/2097* (2019.01); *E21B 43/26* (2013.01)

(58) Field of Classification Search
CPC ............... G05D 16/20; G05D 16/2006; G05D 16/2013; G05D 16/202; G05D 16/2022;
(Continued)

(56) References Cited

U.S. PATENT DOCUMENTS 4,186,766 A * 2/1980 Snyder .................. F16K 17/105
137/492.5
6,640,901 B1 * 11/2003 Appleford ................. H02J 4/00
166/267

(Continued)

OTHER PUBLICATIONS

Written Opinion of the International Searching Authority in international application PCT/US2018/066777 dated Mar. 15, 2019, 11 pages.

*Primary Examiner* — Hailey K. Do
(74) *Attorney, Agent, or Firm* — Jonathan Pierce; Pierre Campanac; Porter Hedges LLP (57) ABSTRACT

An overpressure control apparatus is used to control jets of high-pressure fracking fluid or other stimulation fluid released from a treatment flowline in cases of overpressure. The apparatus includes a collection tank and one or more valves, which can all be mounted on or integrated to a skid. The sizes and weights of the collection tank and the skid may help to keep the apparatus on the ground during an overpressure event. The apparatus can be provided with an offline testing system that allows an operator to close off the communication between the apparatus and the treatment flowline, and instead, pump a clean fluid such as water at high-pressure to test the proper functioning of the valve.

20 Claims, 11 Drawing Sheets

(51) Int. Cl.
 *F16K 3/00* (2006.01)
 *F16K 17/18* (2006.01)
 *E21B 43/26* (2006.01)

(58) Field of Classification Search
 CPC ............ G05D 16/2026; G05D 16/204; G05D 16/206; G05D 16/024; G05D 16/2066; G05D 16/208; G05D 16/2086; G05D 16/2097; E21B 41/0021; E21B 43/26
 See application file for complete search history.

(56) References Cited

U.S. PATENT DOCUMENTS

| | | | |
|---|---|---|---|
| 8,967,271 | B2 | 3/2015 | Laminson |
| 9,163,619 | B2 | 10/2015 | Lymberopoulos |
| 9,441,453 | B2 | 9/2016 | Lymberopoulos et al. |
| 9,482,075 | B2 * | 11/2016 | Smedstad ........... E21B 41/0007 |
| 10,174,584 | B2 | 1/2019 | Kajaria et al. |
| 2008/0156077 | A1 | 7/2008 | Flanders |
| 2012/0227983 | A1 * | 9/2012 | Lymberopoulos ........................ F16K 31/1262 166/373 |
| 2016/0053597 | A1 | 2/2016 | Brown et al. |
| 2017/0040553 | A1 | 3/2017 | Watabe et al. |

* cited by examiner

OVERPRESSURE PROTECTION APPARATUS

This application is a national stage entry under 35 U.S.C. § 371 of International Application No. PCT/US2018/066777, filed on Dec. 20, 2018, which claims priority to U.S. Provisional Application Ser. No. 62/609,478, filed on Dec. 22, 2017, and U.S. Provisional Application Ser. No. 62/635,925, filed on Feb. 27, 2018. All the priority applications are incorporated by reference herein for any and all purposes.

BACKGROUND

This disclosure relates generally to overpressure protection apparatus and methods of use in well stimulation systems.

Well stimulation often involves pumping high-pressure abrasive or acid fluids into a hydrocarbon reservoir to enhance reservoir productivity (hydraulic fracturing, acidizing, etc.). The higher the pressure pumped into the reservoir, the greater potential there is to maximize returns of hydrocarbons, so the oil and gas industry has naturally been incentivized to keep pumping at higher pressures over the years, sometimes up to 15,000 psi. Thus, well stimulation operations can be dangerous. For example, due to a variety of factors (pressure control malfunctions, the number of pumps in service, pack-offs downhole, flow flowline blockages, human error, etc.), the pressure in these well stimulation operations can spike very quickly, which can damage people and equipment, sometimes catastrophically. Therefore, safety systems must be employed to protect the people, the environment, and the machinery on-site. In particular, the operators of these well stimulation sites usually require an overpressure protection system, which offers protection against critical failures occurring as a result of over-pressuring fluid during well stimulation operations. The overpressure protection system usually includes fail-open valves that automatically open to vent excess pressure.

Also, the operators usually require that the overpressure protection system be tested routinely to prove that the overpressure protection system would work in an emergency and has not been unduly damaged by the stimulation fluid. During these tests, the fail-open valves are required to open against high-pressure stimulation fluids, which are often abrasive. While the test frequency is at the discretion of each operator, the system is often tested so frequently that it can fail prematurely, thus hindering operations while the system is repaired or a replacement is made available.

Further, because of the violent nature of venting high-overpressure, current pressure protection systems have a tendency of jumping high off the ground, consequently damaging connecting flowlines or the systems themselves and creating additional hazards to the personnel on-site.

Still further, other overpressure protection systems in the market use fail-open valves that have a smaller bore than the inner diameter, typically three inches, of the flowlines coupled to the valves. The smaller bore creates a choking effect which lengthens the time it takes to vent pressure and ultimately damages the valves.

Lastly, while there are several traditional fail-open valve designs for venting the overpressure, such as rupture disks and pop-off valves, their set-points are not precise and resetting them after an over-pressure event can be a challenge.

Therefore, there is a continuing need in the art for overpressure protection apparatus and methods of use in well stimulation systems.

SUMMARY

The disclosure describes an overpressure protection apparatus. The overpressure protection apparatus may be used to control jets of high-pressure fracking fluid or other stimulation fluid released from a treatment flowline in cases of overpressure.

The overpressure protection apparatus may comprise a skid. The skid may include cladding.

The overpressure protection apparatus may comprise a collection tank, which may be mounted on the skid. The collection tank may include cladding. The collection tank may include baffles. The collection tank may include a degasser or a vent.

The overpressure protection apparatus may comprise a valve, which may be mounted on the skid. The valve may be a gate valve, a fail-open valve, or preferably a fail-open gate valve. In some embodiments, the overpressure protection apparatus may further comprise a plurality of valves, which each may be mounted on the skid. Each of the plurality of valves may be a gate valve, a fail-open valve, or preferably a fail-open gate valve. The plurality of valves may be provided for redundancy.

The overpressure protection apparatus may comprise a first flowline coupled to the valve and to the collection tank. The first flowline may have a flowline bore diameter that is essentially equal to the valve bore diameter. The first flowline may be essentially straight to limit an impingement force on an interior of the first flowline of the jet of high-pressure fracking fluid or other stimulation fluid released in cases of overpressure. In embodiments comprising a plurality of valves, the overpressure protection apparatus may further comprise a plurality of first flowlines, each coupled to a corresponding one of the plurality of valves and to the collection tank. The first flowline may be terminated by a diffuser. The first flowline may include a first portion located outside the collection tank and a second portion located inside the collection tank. The second portion may have a diameter larger than the diameter of the first portion, for example, twice larger.

The overpressure protection apparatus may comprise a junction coupled to the valve. The junction may be adapted for being further coupled to a second flowline and to a third flowline. The second flowline may be coupled to a treatment flowline containing an abrasive or acid fluid, and/or the second flowline may be coupled to a source of clean fluid. The clean fluid may be non-acidic and essentially free of proppant. For example, the clean fluid may be water. In embodiments comprising a plurality of valves, each of the plurality of valves may be coupled to the junction and to the collection tank. For example, each of the plurality of valves may be coupled in series to the junction and to the collection tank.

The overpressure protection apparatus may comprise an actuator, which may be linked to the valve. The valve and the actuator may be configured to fail open. The actuator may be a hydraulic actuator. For example, the actuator may comprise a hydraulic cylinder coupled to a link. The hydraulic cylinder may have a port for flowing hydraulic fluid therethrough. The actuator may further comprise a spring configured to bias the hydraulic cylinder toward a retracted position. The hydraulic cylinder, the port, and the spring may preferably be designed to stroke the link by a distance essentially equal to the diameter of the valve bore in four seconds or less. In embodiments comprising a plurality of valves, the overpressure protection apparatus may further comprise a plurality of actuators, which may be linked to a corresponding one of the plurality of valves. Each of the plurality of actuators may be a hydraulic actuator, such as previously described.

The overpressure protection apparatus may comprise a controller coupled to a pressure sensor and to the actuator. The controller may be programmed to energize the actuator in response to pressure measurements by the pressure sensor. In embodiments comprising a plurality of valves linked to a corresponding one of a plurality of actuators, the controller may be coupled to each of the plurality of actuators. The controller may be programmed to pressurize any of the plurality of actuators in response to pressure measurements performed by the pressure sensor. For example, the controller may be programmed to de-pressurize one of the plurality of actuators at a time.

The disclosure also describes methods of using the overpressure protection apparatus.

The methods may comprise the step of opening communication between the valve (for example, a service valve selected from the plurality of valves), the pressure sensor, and a treatment flowline containing an abrasive or acid fluid.

The methods may comprise the step of causing the actuator to shift and the valve to open in response to the controller detecting a pressure measurement higher than a first predetermined threshold.

The methods may comprise the step of venting a pressure of the abrasive or acid fluid through the valve. During the venting of the pressure of the abrasive or acid fluid through the valve, movement of the flowline coupled to the valve and the collection tank may be restrained. For example, the collection tank and the valve are mounted to the skid such as to restrain the movement of the flowline coupled to the valve and the collection tank. The cladding of the skid or the collection tank may increase mass in an amount sufficient to restrain movement of the skid.

The methods may comprise the step of containing a jet of the abrasive or acid fluid flowing through the valve into the collection tank coupled to the valve.

The methods may comprise the step of deflecting the jet of the abrasive or acid fluid to limit an impingement force of the jet on the collection tank, for example, with baffles or with a diffuser.

The methods may comprise the step of causing the actuator to shift back and the valve to close in response to the controller detecting a pressure measurement lower than a second predetermined threshold.

The methods may comprise the step of isolating the valve and the pressure sensor from the treatment flowline.

The methods may comprise the step of flowing the clean fluid from the source of clean fluid through the valve and past the pressure sensor while the valve and the pressure sensor are isolated from the treatment flowline.

The methods may comprise the step of filling a portion of a flowline coupled to the valve with the clean fluid, wherein the portion of the flowline is directly upstream of the valve.

The methods may comprise the step of increasing a pressure of the clean fluid while the valve and the pressure sensor are isolated from the treatment flowline and until the controller causes the actuator to shift and the valve to open.

The methods may comprise the step of venting the pressure of the clean fluid while the valve and the pressure sensor are isolated from the treatment flowline and until the controller causes the actuator to shift back and the valve to close.

The methods may comprise the step of isolating the valve and the pressure sensor from the source of clean fluid.

The methods may comprise the step of opening a communication between the valve, the pressure sensor, and the treatment flowline while the valve and the pressure sensor are isolated from the source of clean fluid.

BRIEF DESCRIPTION OF THE DRAWINGS

For a more detailed description of embodiments of the disclosure, reference will now be made to the accompanying drawings, wherein.

DETAILED DESCRIPTION

It is to be understood that the following disclosure describes several exemplary embodiments for implementing different features, structures, or functions of the invention. Exemplary embodiments of components, arrangements, and configurations are described below to simplify the disclosure; however, these exemplary embodiments are provided merely as examples and are not intended to limit the scope of the invention. Additionally, the disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Finally, the exemplary embodiments presented below may be combined in any combination of ways, i.e., any element from one exemplary embodiment may be used in any other exemplary embodiment, without departing from the scope of the disclosure.

All numerical values in this disclosure are approximate values unless otherwise specifically stated. Accordingly, various embodiments of the disclosure may deviate from the numbers, values, and ranges disclosed herein without departing from the intended scope. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

If one item is coupled to, mounted to or on, or integrated to or with, another item, such items can be permanently or releasably connected directly to one another or connected indirectly to one another via additional, interposed items. Moreover, certain terms used throughout the following description and claims refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but are equivalent.

Figure 1:
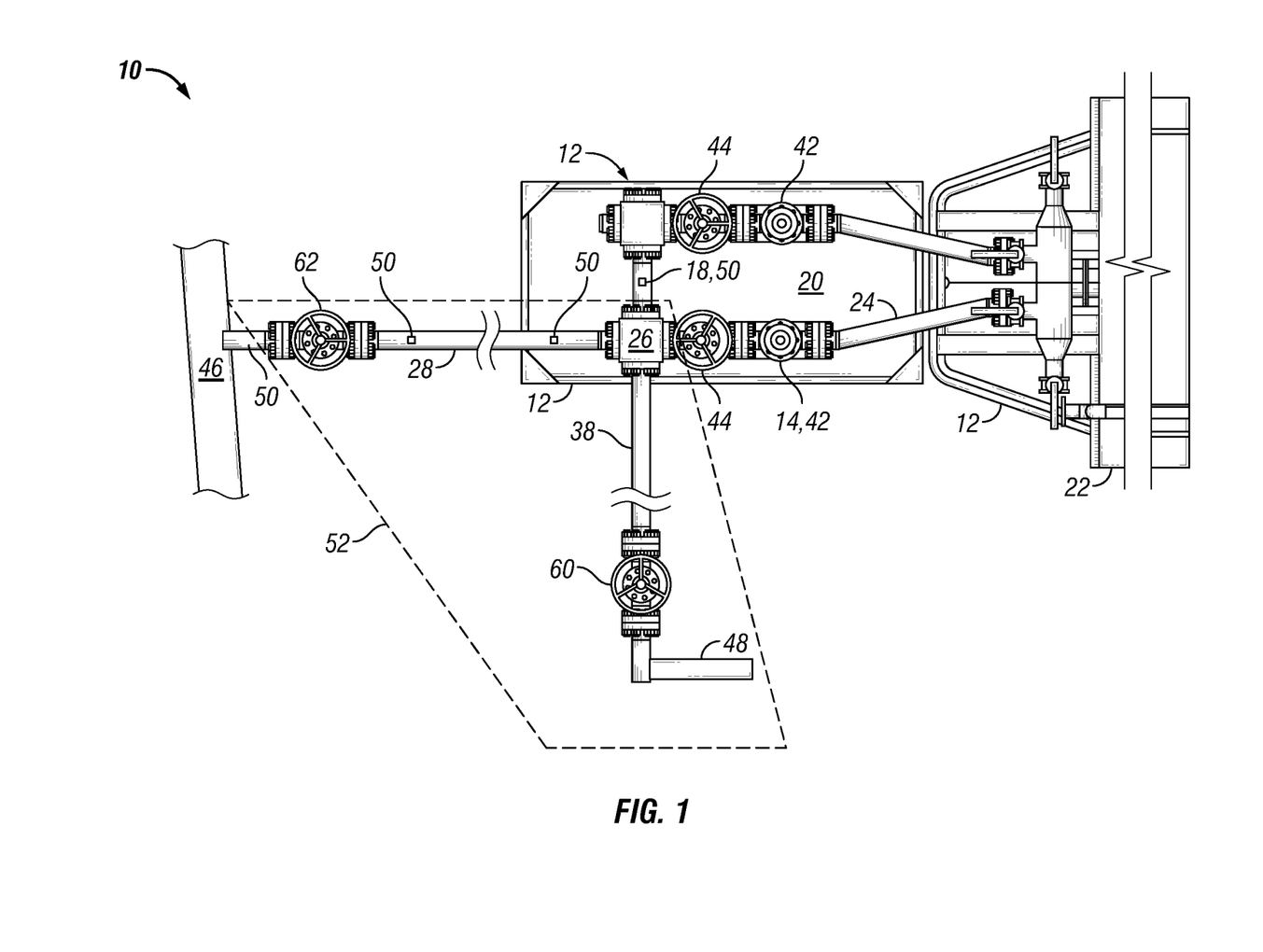
FIG. 1 is a top view of a first embodiment of an overpressure protection apparatus for use in stimulation systems.
Figure 2:
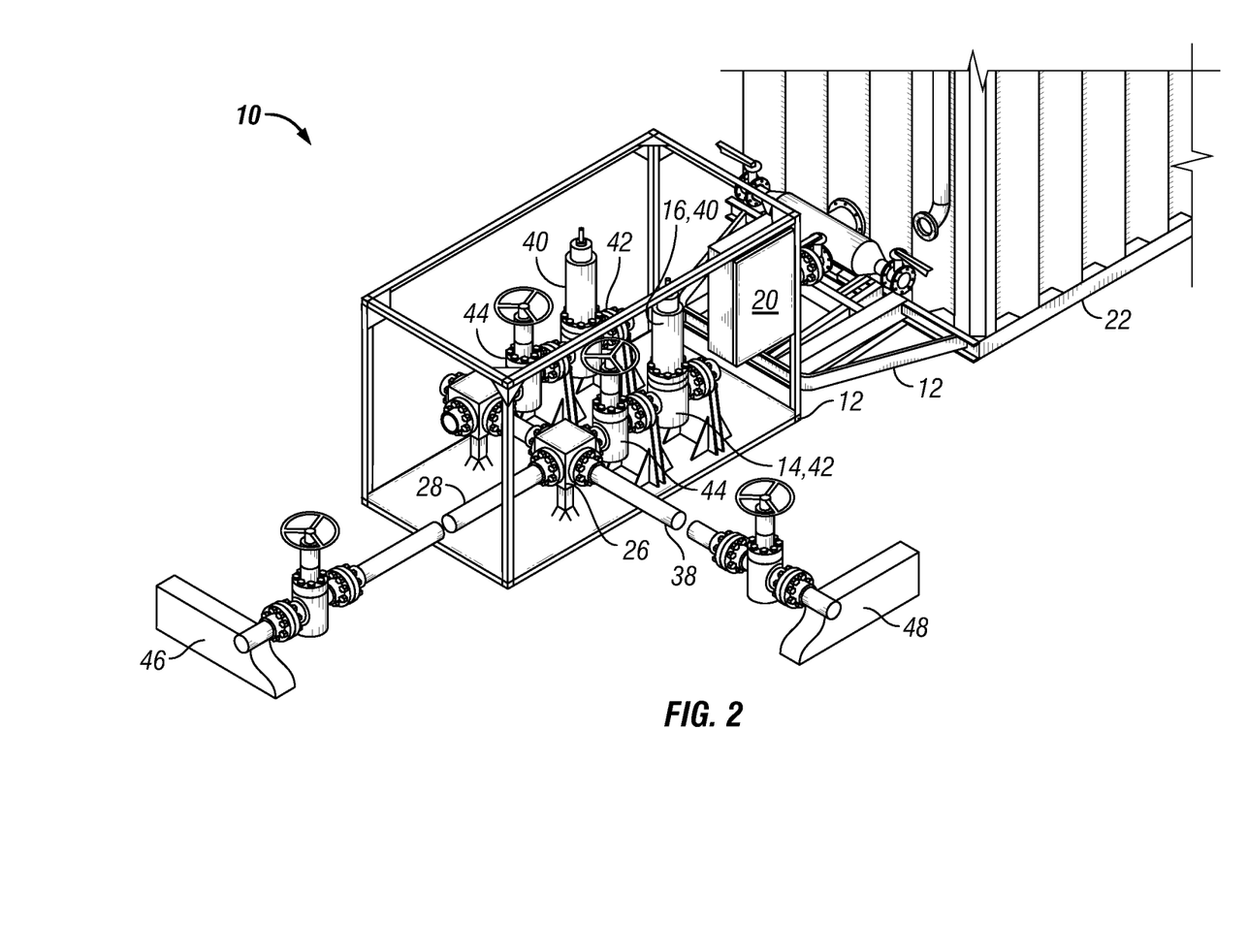
FIG. 2 is a perspective view of the overpressure protection apparatus shown in FIG. 1.

Referring initially to FIGS. 1 and 2, an overpressure protection apparatus 10 in accordance with a first embodiment is illustrated.

The apparatus 10 comprises a skid 12. The apparatus 10 may be designed to completely fit on one unitary skid 12, which may preferably be small enough to be transported by a single truckload. Skid 12 can be any platform, trailer, or other structure to which the apparatus 10 can be mounted, integrated, or coupled.

The apparatus 10 also comprises a collection tank 22, which can be mounted on or integrated to the skid 12, to control jets of high-pressure fracking fluid or other stimulation fluid released from a treatment flowline 46 in cases of overpressure. The collection tank 22 may include baffles to deflect the jets and limit the impingement force of the jets on the collection tank 22. The sizes and weights of the collection tank 22 and the skid 12 may help to keep the apparatus 10 on the ground during an overpressure event. Mounting the collection tank 22 on the skid 12, or integrating the collection tank 22 to the skid, forms a rigid body whose combined mass and size is larger than the individual mass and size of the collection tank 22 or the skid 12. As such, mounting the collection tank 22 on the skid 12 is more efficient at keeping the apparatus 10 on the ground. In addition, the skid 12 or the collection tank 22 may include cladding to increase their combined mass in an amount sufficient to restrain movement of the skid 12 during the overpressure event. Thus, instead of being uncontrollably released on-site, the fracking fluid or other stimulation fluid may be contained in the collection tank 22, for example until it is pumped by a supplier of fracking fluid or other stimulation fluid for recycling. Accordingly, the collection tank 22 reduces spilling of fracking fluid or other stimulation fluid on-site. In cases where formation or other gasses are dissolved in the fracking fluid or other stimulation fluid, the collection tank 22 may optionally be equipped with a degasser.

During an overpressure event, the apparatus 10 releases pressure via a valve 14 controlled by a Programmable Logic Controller 20 ("PLC") or a controller of another type until the pressure is reduced to safer levels and operations can resume within a predetermined pressure envelope. The valve 14 is shown mounted on or integrated to the skid 12. The valve 14 may be a gate valve.

The apparatus 10 comprises a first flowline 24 coupled to the valve 14 and to the collection tank 22. Because the collection tank 22 and the valve 14 are mounted on the skid 12, movement of the first flowline 24 during the release of the high-pressure fracking fluid or other stimulation fluid is restrained. The first flowline 24 has a flowline bore; a diameter of the flowline bore may be on the order of three inches.

The valve 14 has a valve bore, which may be equal to, or essentially equal to, the diameter of the flowline bore to create a full-bore system that alleviates the choking effect that may otherwise be caused by a smaller bore diameter of the valve 14.

The apparatus 10 comprises a junction 26 coupled to the valve 14. The junction 26 is adapted for being further coupled to at least one second flowline 28. The second flowline 28 is coupled to the treatment flowline 46 containing the fracking fluid or other stimulation fluid. The junction 26 may further be adapted for being coupled to a third flowline 38. The third flowline 38 may be coupled to a source 48 containing a clean fluid. The clean fluid is non-acidic (e.g., pH larger than five, and preferably approximately seven), and essentially free of proppant or other abrasive particles. For example, the clean fluid may be water. The junction 26 may be mounted on or integrated to the skid 12.

The apparatus 10 is preferably designed to provide pressure sensing and overpressure control that can detect patterns in pressure measurements and make automated decisions about when to start and stop venting the fluid pressure as quickly as possible. Accordingly, the fracking fluid or other stimulation fluid pressure may not be completely vented (i.e., may not be vented to atmospheric pressure) upon actuation of the overpressure protection apparatus 10 (e.g., upon pressure release via the valve 14), and well stimulation operations can resume quickly and safely without having to re-pressurize the well to a level suitable for stimulation of the reservoir. The PLC 20 providing the pressure control may advantageously be located on the skid 12, for example in a control cabinet; however, a control signal, a monitoring signal, or both can be routed to a data van positioned on-site remotely from the skid 12. When an overpressure event occurs, a report analyzing pressure data collected during a time interval after the event, such as ten minutes, may be generated and displayed in the data van for record keeping and/or review.

To control overpressure, the apparatus 10 comprises an actuator 16, for example a hydraulic actuator. The actuator 16 is linked to the valve 14. The valve 14 and the actuator 16 may be configured to fail open. The apparatus 10 comprises at least one pressure sensor 18, and preferably several pressure sensors 50—one of which being the pressure sensor 18, positioned upstream from the valve 14 and in pressure communication with the treatment flowline 46. PLC 20 can be coupled to the pressure sensor 18 and to the actuator 16, wherein the PLC 20 is programmed to energize the actuator 16 in response to pressure measurements performed by the pressure sensor 18, or preferably by the several pressure sensors 50. The PLC 20 may be programmed to detect a pressure spike over a dangerous level, such as a first predetermined threshold. The PLC 20 may then cause the valve 14, for example, a hydraulically actuated fail-open valve, to open as quickly as possible, e.g., in four seconds or less, and preferably in approximately two seconds, to vent the pressure in treatment flowline 46. For example, the PLC 20 may cause hydraulic fluid to be ejected from a hydraulically actuated fail-open valve. In response to detecting that the pressure in the treatment flowline 46 is returning to a safe level, such as under a second predetermined threshold, the PLC 20 may cause the valve 14 to close and seal the pressure in the treatment flowline 46 as quickly as possible, e.g., in four seconds or less, and preferably in approximately two seconds. For example, the PLC 20 may cause hydraulic fluid to be pumped back into a hydraulically actuated fail-open valve. Then, the PLC 20 may direct the valve 14 to remain idle in the closed position until another pressure spike or other threshold occurs.

The apparatus 10 is preferably provided with an offline testing system 52 which allows the operator to close off the communication between the apparatus 10 and the treatment flowline 46, and instead, pump a clean fluid such as water at high-pressure to test the proper functioning of the apparatus 10. Opening the valve 14 against clean fluid instead of fracking fluid or other stimulation fluid may be far less damaging to the valve 14, and may greatly alleviate premature failure of the valve 14. Thus, the operating life of the apparatus 10 may be extended.

Accordingly, a method of testing the apparatus 10 involves the step of isolating the valve 14 and the pressure sensor 18 from the treatment flowline 46 containing the fracking fluid or other stimulation fluid. The testing method further involves the step of flowing the clean fluid from the source 48, into communication with the pressure sensor 18, and through the valve 14 while the valve 14 and the pressure sensor 18 (or the valve 14 and one or more of the several pressure sensors 50) are isolated from the treatment flowline 46. For example, a valve 62 (e.g., a manual valve) that is provided on the second flowline 28 may be closed. Then, while the valve 62 is closed, a valve 60 (e.g., also a manual valve) provided on the third flowline 38 may be opened. In some embodiments, the testing method may further involve the step of filling a portion of a flowline coupled to the valve 14 with the clean fluid contained in the source 48, wherein the portion of the flowline is directly upstream of the valve 14. For example, the portion of the flowline filled with the clean fluid may be located between the valve 14 and the junction 26, may include a portion of the second flowline 28 and/or a portion of the treatment flowline 46, and may include valve bores or passageway of other flow control elements. Such filling may flush abrasive or corrosive fluids that may damage the valve 14 into the collection tank 22. The testing method further involves the step of increasing the pressure of the clean fluid from source 48 while the valve 14 and the pressure sensor 18 (or the valve 14 and one or more of the several pressure sensors 50) are isolated from the treatment flowline 46 and until the PLC 20 causes the actuator 16 to shift and the valve 14 to open. The testing method further involves the step of reducing the pressure of the clean fluid from source 48 while the valve 14 and the pressure sensor 18 are isolated from the treatment flowline 46 and until the PLC 20 causes the actuator 16 to shift back and the valve 14 to close. The testing method may further involves the step of isolating the valve 14 and the pressure sensor 18 from the source 48 and the step of opening the communication between the valve 14, the pressure sensor 18, and the treatment flowline 46 while the valve 14 and the pressure sensor 18 are isolated from the source 48 of clean fluid to return the configuration of the apparatus 10 to a configuration capable of providing protection against overpressure of the treatment flowline 46. For example, the valve 60 may be closed, and then, while the valve 60 is closed, the valve 62 may be opened to establish fluid communication between the valve 14 or the pressure sensor 18 and the treatment flowline 46.

In some embodiments, it may be advantageous to equip the apparatus 10 with a redundant set of valves. If, after testing the apparatus 10, it is determined that the valve 14 was not sealing correctly, got washed out, or had failed in any other way, then flow to the valve 14 may be routed through another valve located in a contingency section of the apparatus 10. The other valve, which may also be a hydraulically actuated fail-open valve, can release the over-pressured fluid into the collection tank 22 in the same way as the valve 14. For example, the apparatus 10 comprises a first plurality of fail-open valves 42—one of which being the valve 14, which may be mounted on or integrated to the skid 12. Each of the first plurality of fail-open valves 42 is coupled in parallel to the junction 26 and to the collection tank 22. Also, an embodiment of the apparatus 10 can comprise a plurality of hydraulic actuators 40—one of which being the actuator 16. Each of the first plurality of fail-open valves 42 is coupled to a corresponding one of the plurality of hydraulic actuators 40. The PLC 20 is coupled to each of the plurality of hydraulic actuators 40.

In the embodiment illustrated in FIGS. 1 and 2, the PLC 20 may be programmed to pressurize all of the plurality of hydraulic actuators 40 in response to pressure measurements performed by the pressure sensor 18. The PLC 20 may also be programmed to de-energize all of the plurality of hydraulic actuators 40 in response to pressure measurements performed by the pressure sensor 18. To block-off flow to any faulty or unused valve of the first plurality of fail-open valves 42, the apparatus 10 further comprises a second plurality of valves 44. The second plurality of valves 44 is also coupled in parallel to the junction 26. Each of the second plurality of valves 44 is also coupled in series with one of the first plurality of fail-open valves 42. Each of the second plurality of valves 44 may be operated manually.

Figure 3:
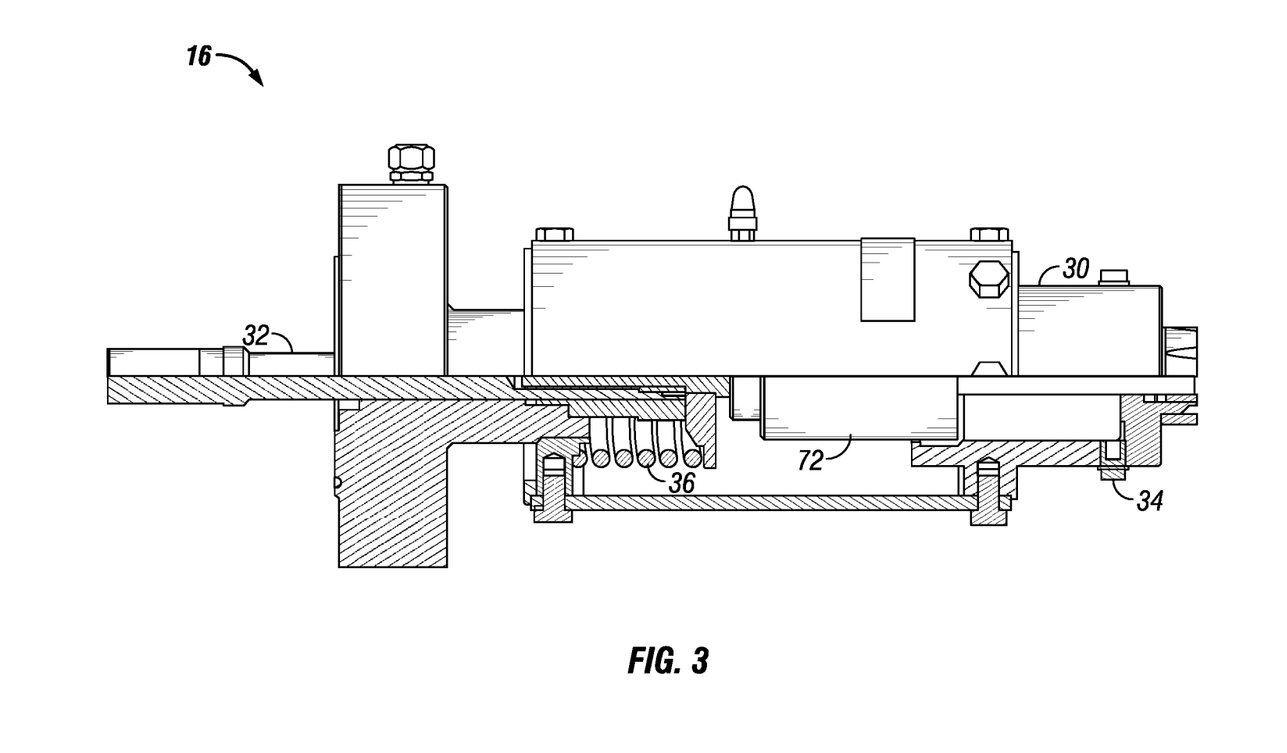
FIG. 3 is a partially sectional view of an actuator for use in connection with an overpressure protection apparatus.

Turning to FIG. 3, an actuator 16 (or actuator 40) is illustrated. The actuator 16 is a hydraulic actuator, which may be used in conjunction with a gate valve, and is configured to fail open.

The actuator 16 comprises a hydraulic cylinder 30 having a piston 72 coupled to a link 32. The actuator 16 is adapted for shifting the link 32 into an extended position (as shown in FIG. 3) or shifting the link 32 back into a retracted position (not shown). For example, the actuator 16 may be coupled to a pump and/or accumulator (not shown) for pressurizing the hydraulic fluid and a low-pressure reservoir (not shown) for storing the hydraulic fluid. The hydraulic cylinder 30 has a port 34 for flowing hydraulic fluid therethrough. Under the direction of the PLC 20 (in FIGS. 1 and 2), the port 34 is selectively coupled to the pump and/or accumulator or to the low-pressure reservoir. The actuator 16 comprises a spring 36 configured to bias the hydraulic cylinder 30 toward the retracted position.

The apparatus 10 may typically employ three-inch fail-open gate valves coupled to three-inch flowlines to create a full-bore system. The strength of the spring 36, the diameter of the hydraulic cylinder 30, and/or the size of the port 34 may be tailored to ensure that the actuator 16 permits a suitable opening/closing time for a three-inch gate valve. Thus, the hydraulic cylinder 30, the port 34, and the spring 36 are advantageously sized to stroke the link 32 by a distance essentially equal to the diameter of the flowline bore in four seconds or less, and preferably in approximately two seconds.

Figure 4A:
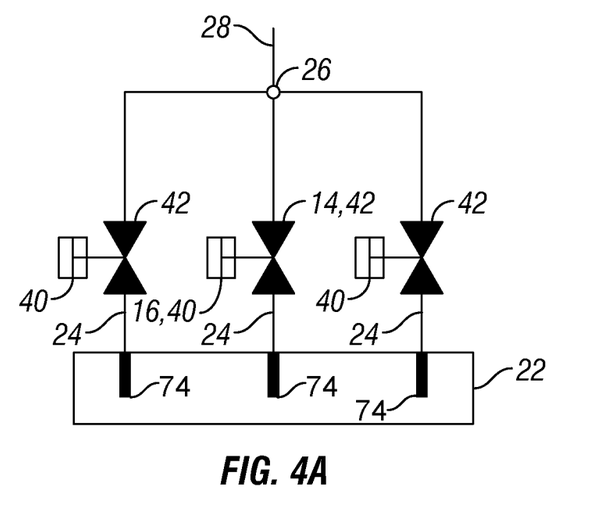
FIGS. 4A and 4B are schematic views of alternative embodiments of overpressure protection apparatus.
Figure 4B:
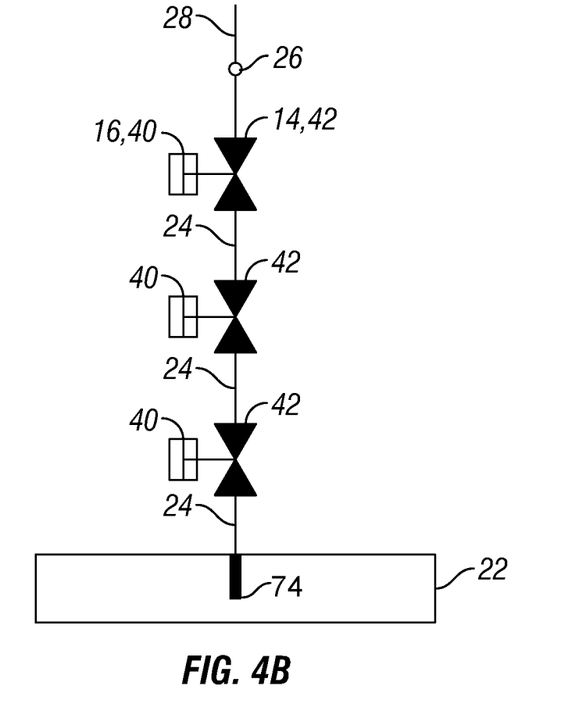

Turning to FIGS. 4A, and 4B, alternative configurations of the apparatus 10 providing a redundant set of valves are illustrated. In both Figures, the apparatus 10 comprises a first plurality of fail-open valves 42. Each of the first plurality of fail-open valves 42 is coupled to the junction 26 and to the collection tank 22.

In FIG. 4A, the first plurality of fail-open valves 42 are coupled in parallel to the junction 26. In contrast, in FIG. 4B, the first plurality of fail-open valves 42 are coupled in series to the junction 26. In both examples shown in FIGS. 4A and 4B, there may be no directional changes in the flowlines 24 that couple each of the first plurality of fail-open valves 42 to the collection tank 22, thereby avoiding the need to implement three axis direction elbows and swivels, such as implemented on the first flowline 24 shown in FIGS. 1 and 2. Also, implementing flowlines that are essentially straight (e.g., less than thirty degrees deflection) can limit the impingement force of the jets of the fracking or other stimulation fluid on the interior of the flowlines. When the impingement force of the jets is limited, erosion of these flowlines may also be reduced. Also restraining movement of the flowlines may become easier when the impinging force is reduced. As shown, the flowlines 24 may penetrate into the collection tank 22. The flowlines 24 may include a first portion located outside the collection tank 22 and a second portion located inside the collection tank 22. The second portion may have a diameter of approximately 6 inches, which is twice larger than the diameter of the first portion. For example, the diameter change may be stepped. The flowlines 24 may be provided with a special termination configured such that the jet of high-pressure fracking fluid or other stimulation fluid is diffused when it leaves the flowlines 24 and enters the collection tank 22. For example, the special termination may include a diffuser 74 that bifurcates the jet.

In both examples shown in FIGS. 4A and 4B, the apparatus 10 comprises a plurality of hydraulic actuators 40. Each of the first plurality of fail-open valves 42 is coupled to a corresponding one of the plurality of hydraulic actuators 40. The PLC 20 is coupled to each of the plurality of hydraulic actuators 40 and is programmed to pressurize any of the plurality of hydraulic actuators 40 in response to pressure measurements performed by the pressure sensor 18 (shown in FIG. 1), or optionally, by the several pressure sensors 50. In contrast with the description of the embodiment shown in FIGS. 1 and 2, where the controller may be programmed to pressurize or depressurize all of the plurality of actuators 40 together, in the embodiments of FIGS. 4A and 4B, the PLC 20 is programmed to de-pressurize only one of the plurality of hydraulic actuators 40 at a time. This one of the plurality of hydraulic actuators 40 is referred to as the service hydraulic actuator. Similarly, the one of the first plurality of fail-open valves 42 corresponding to the service hydraulic actuator is referred to as the service fail-open valve. The other hydraulic actuator(s) may be referred to as the fallback hydraulic actuator(s), and the fail-open valve(s) corresponding to the fallback hydraulic actuator(s) may be referred to as the fallback fail-open valve(s).

In both examples shown in FIGS. 4A and 4B, the service hydraulic actuator may be selected based on tests performed to check the proper functioning of the apparatus 10. In the embodiment of FIG. 4B, it may be advantageous to select the one of the plurality of hydraulic actuators 40 corresponding to the fail-open valve that is functioning properly, and that is located the further away from the collection tank 22. As such, the fallback fail-open valves(s) located downstream of the service fail-open valve are only minimally exposed to the pressure of fracking or other stimulation fluid during overpressure events.

In both examples shown in FIGS. 4A and 4B, the second plurality of valves 44 shown in FIGS. 1 and 2 may be omitted.

Figure 5A:
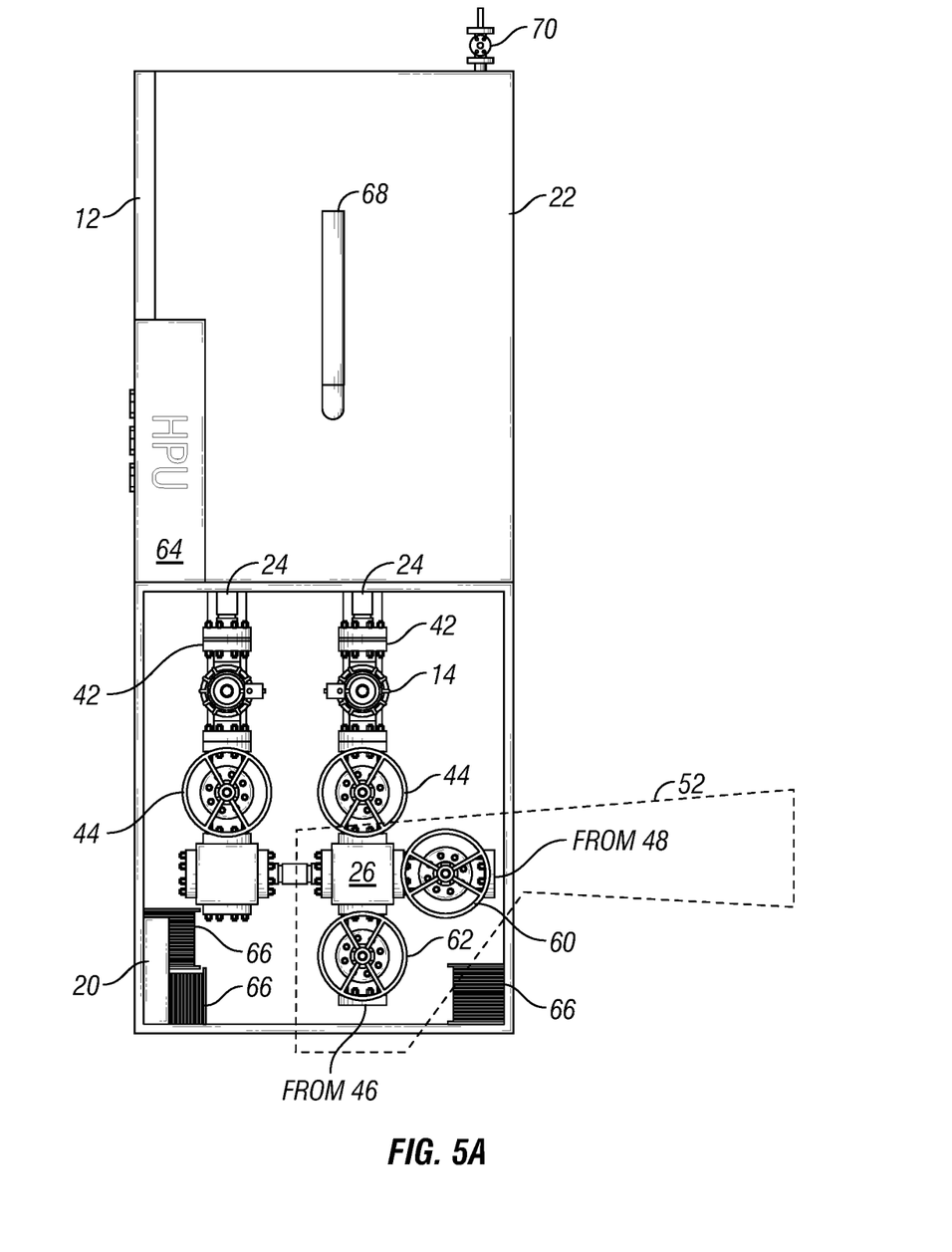
FIG. 5A is a top view of a second embodiment of an overpressure protection apparatus for use in stimulation systems.
Figure 5B:
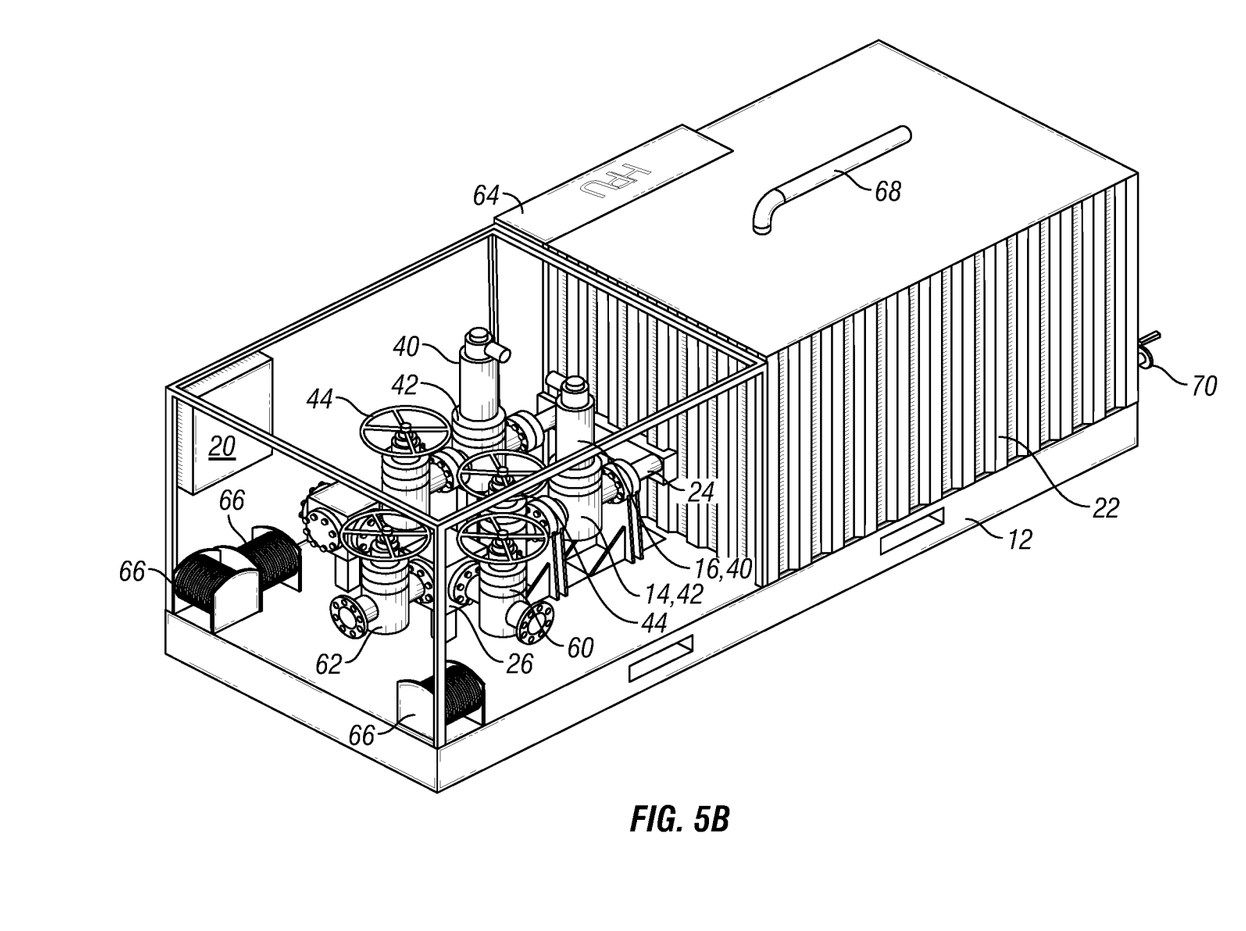
FIG. 5B is a perspective view of the overpressure protection apparatus shown in FIG. 5A.

Turning to FIGS. 5A and 5B, a second embodiment of an overpressure protection apparatus is illustrated. A difference between the second embodiment and the first embodiment is that the flowlines 24 coupled to the fail-open valves 42 and the collection tank 22 are essentially straight, so that there may be no directional changes in the flowlines 24 that couple each of the first plurality of fail-open valves 42 to the collection tank 22.

Also shown in FIGS. 5A and 5B is a Hydraulic Power Unit 64 ("HPU"), which may be used for pressurizing the hydraulic fluid to actuate the fail-open valves 42 with the actuator 40 (or at least actuate the valve 14 with the actuator 16). Also shown are transducer reels 66 that can be used to couple pressure sensors 18, 50 remotely positioned, for example as shown in FIG. 1, to the PLC 20 located in a control cabinet.

Still shown in FIGS. 5A and 5B, a drain 70 is coupled to the collection tank 22 for permitting the fracking fluid or other stimulation to be pumped by a supplier of fracking fluid or other stimulation fluid for recycling. The drain 70 may include a ball valve. A gas vent 68 (or a degasser as previously mentioned) is coupled to a roof of the collection tank to permit gases to escape the collection tank 22. A level indicator (not shown) may be provided on the collection tank.

Yet another difference between the first embodiment and the second embodiment is that the valve 60, which is provided in the first embodiment on the third flowline 38 coupling the junction 26 to the source 48 containing the clean fluid, is mounted on or integral to the skid 12 only in the second embodiment. The third flowline 38 (not shown in FIGS. 5A and 5B) may be indirectly coupled to the junction 26 via the valve 60. Similarly, the valve 62, which is provided in the first embodiment on the second flowline 28 coupling the junction 26 to the treatment flowline 46, is also mounted on or integral to the skid 12 only in the second embodiment.

Figure 6A:
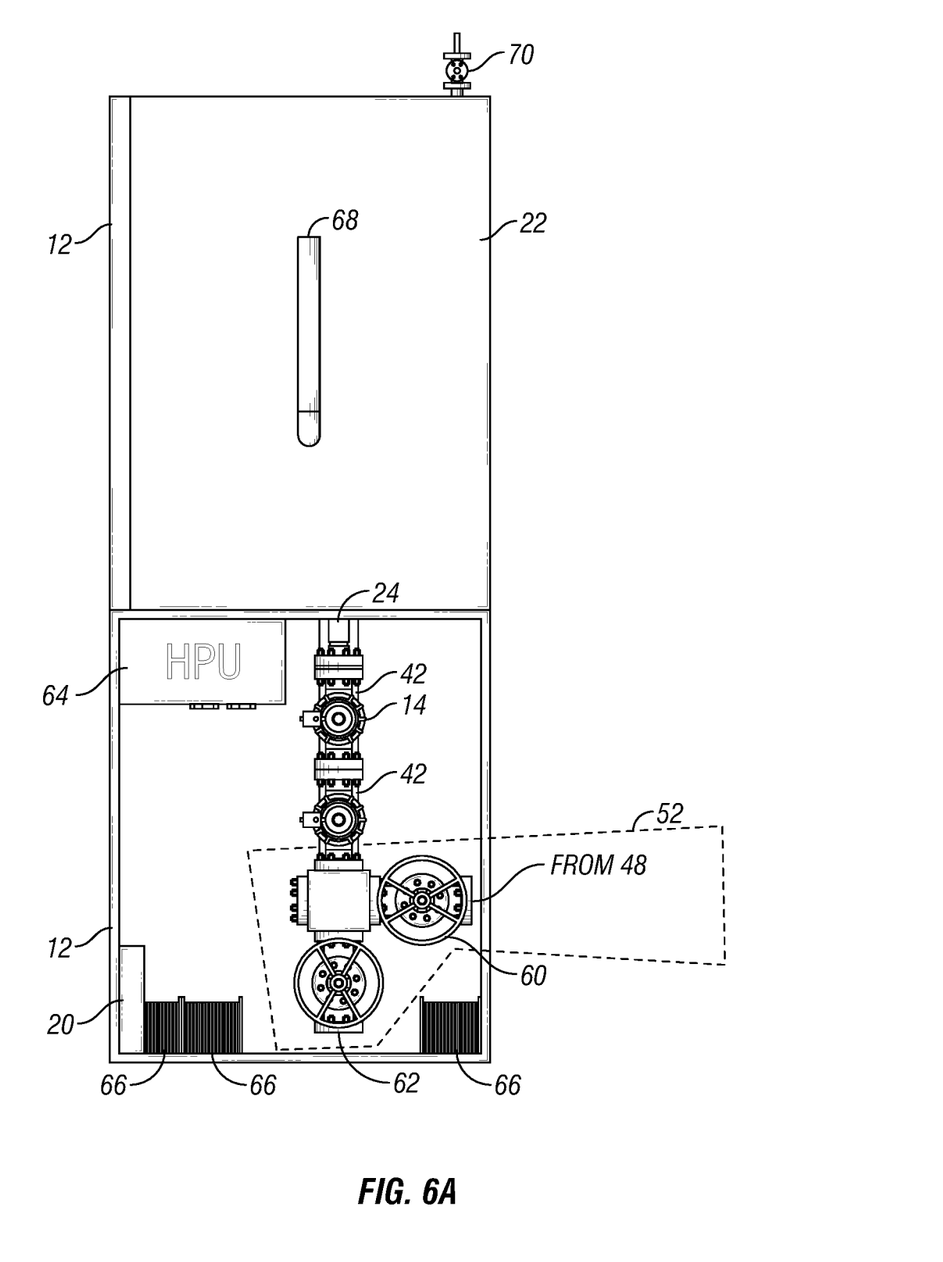
FIG. 6A is a top view of a third embodiment of an overpressure protection apparatus for use in stimulation systems.
Figure 6B:
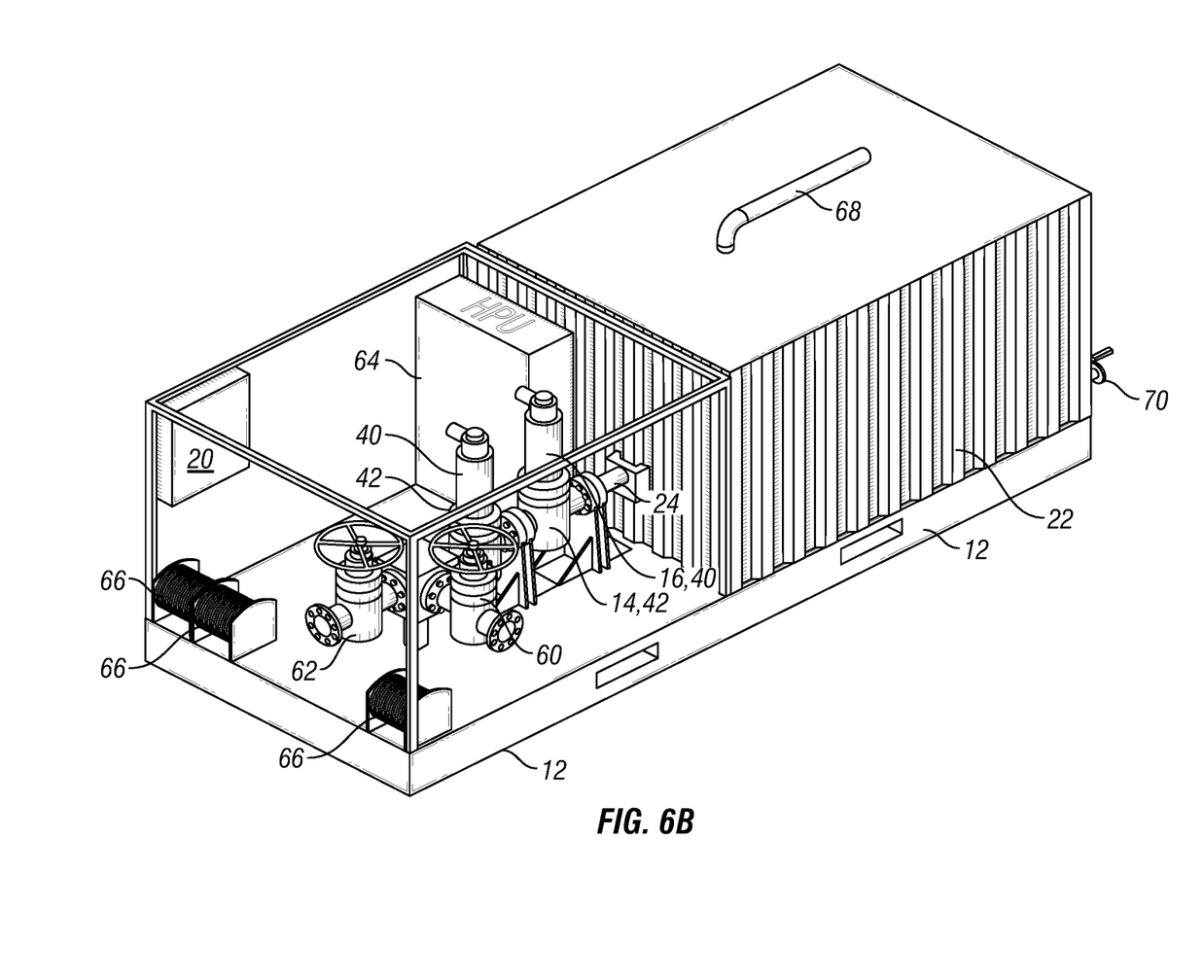
FIG. 6B is a perspective view of the overpressure protection apparatus shown in FIG. 6A.

Turning to FIGS. 6A and 6B, a third embodiment of an overpressure protection apparatus is illustrated. A difference between the third embodiment and the first and the second embodiments is that the fail-open valves 42 are arranged in series to the main treatment line (or more specifically to the junction 26) and to the collection tank 22. Also, the second plurality of valves 44 shown in FIGS. 1 and 2 is omitted.

Figure 7A:
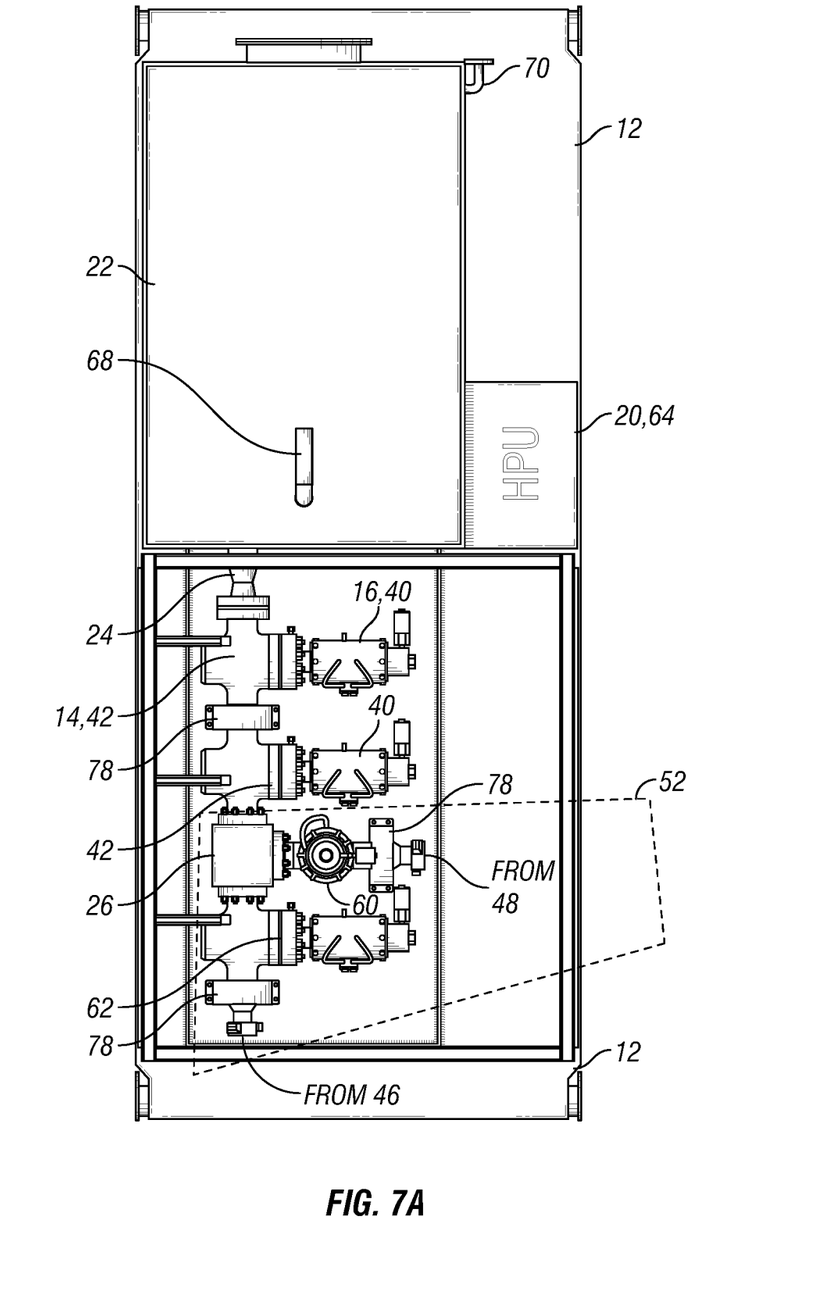
FIG. 7A is a top view of a fourth embodiment of an overpressure protection apparatus for use in stimulation systems.
Figure 7B:
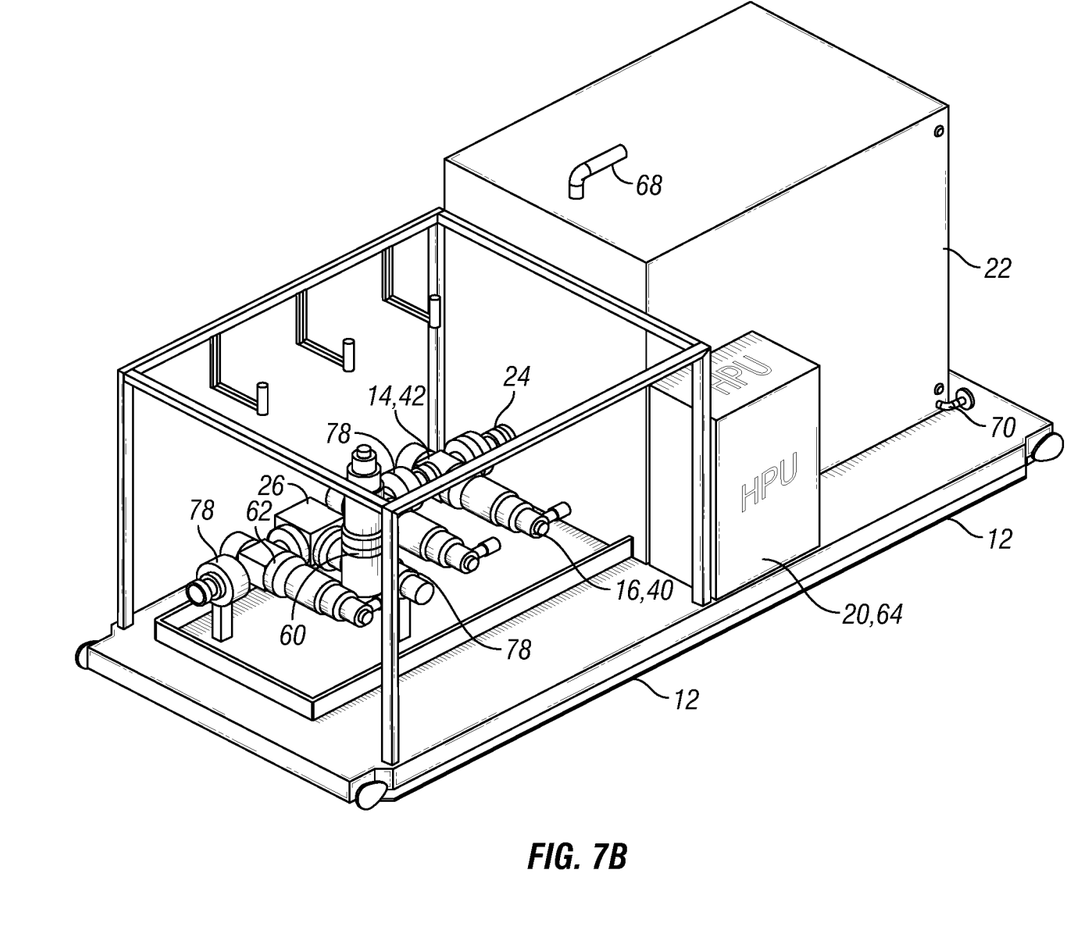
FIG. 7B is a perspective view of the overpressure protection apparatus shown in FIG. 7A.

Turning to FIGS. 7A and 7B, a fourth embodiment of an overpressure protection apparatus is illustrated. Like the third embodiment of FIGS. 6A and 6B, the fail-open valves 42 are arranged in series to the main treatment line (or more specifically to the junction 26) and to the collection tank 22. A difference between the fourth embodiment and the third embodiment is that the valve 60 and 62 are hydraulically actuated instead of manually actuated. As such, all the valves of the apparatus 10 may be operated remotely, thus avoiding the need for personnel to approach high-pressure equipment.

Further, the valves 42 and the valve 62 are oriented horizontally so that the valve bodies do not act as a sump for proppant particles (e.g., sand) that may be contained in the fracking fluid or other treatment fluid. Such horizontal orientation may increase the life of the valves 42 and the valve 62. However, valve 60 may remain oriented vertically as it is usually in contact with clean fluid. Also, the fail-open valves 42 and/or the junction 26 are mounted to the skid using clamps 78. As shown, one clamp 78 may be provided on one side of the valve 14, one clamp 78 may only be provided on one side of the valve 60, and one clamp 78 may only be provided on one side of the valve 62.

Figure 8:
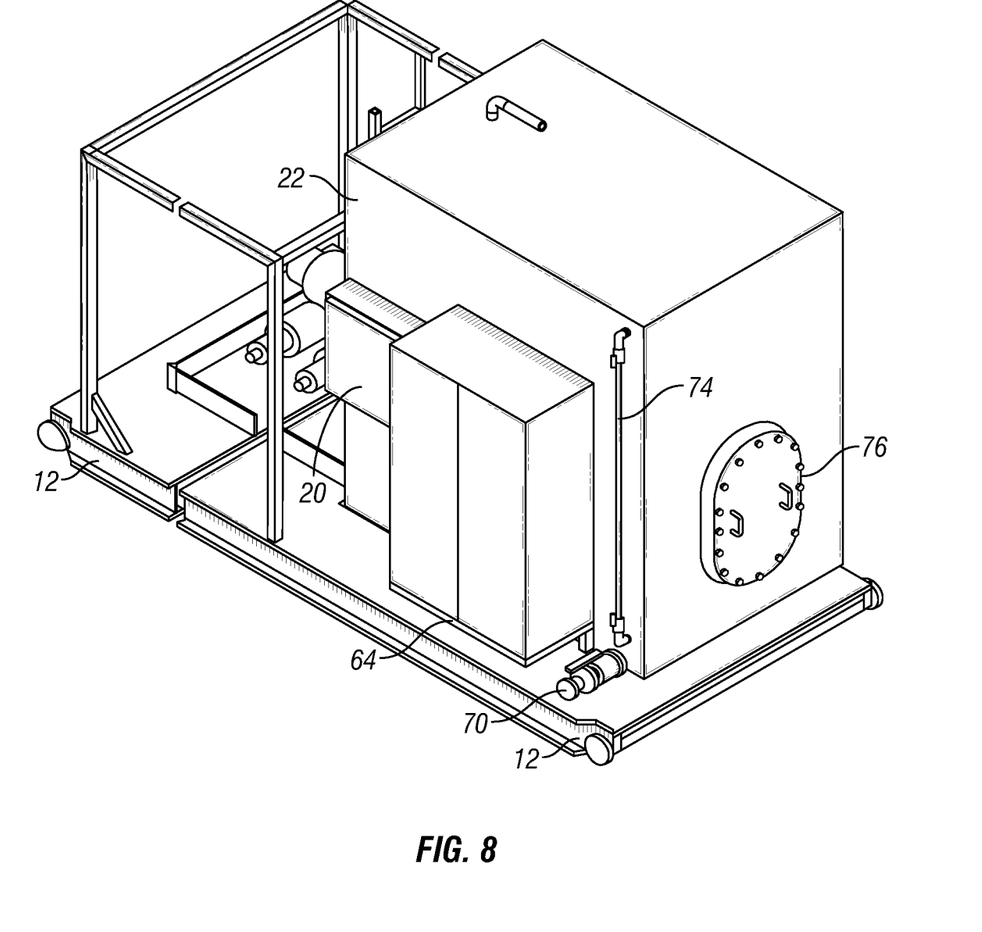
FIG. 8 is a perspective view of a fifth embodiment of an overpressure protection apparatus for use in stimulation systems.

Turning to FIG. 8, a fifth embodiment of an overpressure protection apparatus is illustrated. Like the fourth embodiment, the overpressure apparatus includes the PLC 20 and the HPU 64, which may be provided on a same side of the collection tank 22. A difference between the fifth embodiment and the fourth embodiment is that the PLC 20 is disposed in an Hoffman enclosure, and the HPU 64 is disposed in a cabinet that is adjacent to Hoffman enclosure.

Further, a level indicator 74 may be provided on the collection tank 22. For example, the level indicator may be implemented with a clear polycarbonate tube connected to an inner volume of the collection tank 22 via ball valves. Also, a hatch 76 may be provided on the collection tank 22. The hatch may be used to access the inner volume of the collection tank 22 during maintenance, such as for replacing a diffuser provide at an end of flowline 24 (shown in FIGS. 4A and 4B).

What is claimed is:

1. An overpressure protection apparatus for use in well stimulation systems, comprising:
    a skid;
    a valve mounted on the skid;
    an actuator, wherein the actuator is linked to the valve, wherein the valve and the actuator are configured to fail open;
    a pressure sensor;
    a controller coupled to the pressure sensor and to the actuator, wherein the controller is programmed to energize the actuator in response to pressure measurements by the pressure sensor;
    a collection tank mounted on the skid;
    cladding on the skid or collection tank to increase mass in an amount sufficient to restrain movement of the skid during overpressure events;
    a first flowline coupled to the valve and to the collection tank; and
    a junction coupled to the valve, wherein the junction is adapted for being further coupled to at least one second flowline.

2. The overpressure protection apparatus of claim 1, wherein the first flowline is terminated by a diffuser.

3. The overpressure protection apparatus of claim 1, wherein the collection tank includes a degasser or a vent.

4. The overpressure protection apparatus of claim 1, wherein the valve is a gate valve, wherein the actuator is a hydraulic actuator.

5. The overpressure protection apparatus of claim 1, wherein the junction is further adapted for being coupled to a third flowline.

6. The overpressure protection apparatus of claim 1, wherein the valve has a valve bore, wherein the first flowline has a flowline bore, and wherein a diameter of the valve bore is essentially equal to the diameter of the flowline bore, and wherein the first flowline is essentially straight to limit an impingement force on an interior of the first flowline of a jet of high-pressure fluid released in cases of overpressure.

7. The overpressure protection apparatus of claim 6, wherein the actuator comprises:
    a hydraulic cylinder coupled to a link, the hydraulic cylinder having a port for flowing hydraulic fluid therethrough; and
    a spring configured to bias the hydraulic cylinder toward a retracted position,
        wherein the hydraulic cylinder, the port, and the spring are designed to stroke the link by a distance essentially equal to the diameter of the valve bore.

8. The overpressure protection apparatus of claim 1, comprising:
    a plurality of hydraulic actuators; and
    a plurality of fail-open valves,
        wherein each of the plurality of fail-open valves is coupled to a corresponding one of the plurality of hydraulic actuators,
        wherein each of the plurality of fail-open valves is coupled to the junction and to the collection tank;
        wherein the controller is coupled to each of the plurality of hydraulic actuators, and
            wherein the controller is programmed to pressurize any of the plurality of hydraulic actuators in response to pressure measurements performed by the pressure sensor.

9. The overpressure protection apparatus of claim 8, wherein the controller is programmed to de-pressurize one of the plurality of hydraulic actuators at a time.

10. The overpressure protection apparatus of claim 9, wherein the plurality of valves is coupled in series to the junction and to the collection tank.

11. A method of using an overpressure protection apparatus, comprising:
    providing an overpressure protection apparatus including a skid, a valve mounted on the skid and linked to an actuator, wherein the valve and the actuator are configured to fail open, a pressure sensor, a controller coupled to the pressure sensor and to the actuator, wherein the controller is programmed to energize the actuator in response to pressure measurements performed by the pressure sensor, a collection tank mounted on the skid, cladding on the skid or collection tank to increase mass in an amount sufficient to restrain movement of the skid during overpressure events, a first flowline coupled to the valve and to the collection tank, and a junction coupled to the valve, wherein the junction is adapted for being further coupled to at least one second flowline;
    opening a communication between the valve, the pressure sensor, and a treatment flowline containing an abrasive or acid fluid, wherein the treatment flowline is coupled to the at least one second flowline;
    causing the actuator to shift and the valve to open in response to the controller detecting a pressure measurement higher than a first predetermined threshold;
    venting a pressure of the abrasive or acid fluid through the valve;
    containing a jet of the abrasive or acid fluid flowing through the valve into the collection tank; and
    causing the actuator to shift back and the valve to close in response to the controller detecting a pressure measurement lower than a second predetermined threshold.

12. The method of claim 11, further comprising deflecting the jet of the abrasive or acid fluid with a diffuser to limit an impingement force of the jet on the collection tank.

13. The method of claim 11, further comprising restraining, during the venting of the pressure of the abrasive or acid fluid through the valve, movement of the first flowline.

14. The method of claim 13, wherein the collection tank and the valve are mounted to the skid to restrain the movement of the first flowline.

15. The method of claim 11, wherein the first flowline is essentially straight to limit an impingement force of the jet on an interior of the first flowline.

16. The method of claim 15, wherein the first flowline includes a first portion located outside the collection tank and a second portion located inside the collection tank, the second portion having a diameter larger than the diameter of the first portion.

17. A method of using an overpressure protection apparatus, comprising:
providing an overpressure protection apparatus including a skid, a valve mounted on the skid and linked to an actuator, wherein the valve and the actuator are configured to fail open, a pressure sensor, a controller coupled to the pressure sensor and to the actuator, wherein the controller is programmed to energize the actuator in response to pressure measurements performed by the pressure sensor, a collection tank mounted on the skid, cladding on the skid or collection tank to increase mass in an amount sufficient to restrain movement of the skid during overpressure events, a first flowline coupled to the valve and to the collection tank, and a junction coupled to the valve, wherein the junction is adapted for being further coupled to at least one second flowline;
isolating the valve and the pressure sensor from a treatment flowline containing an abrasive or acid fluid, wherein the treatment flowline is coupled to the at least one second flowline;
flowing a clean fluid from a source through the valve and past the pressure sensor while the valve and the pressure sensor are isolated from the treatment flowline, wherein the clean fluid is non-acidic and essentially free of proppant;
increasing a pressure of the clean fluid while the valve and the pressure sensor are isolated from the treatment flowline and until the controller causes the actuator to shift and the valve to open;
venting the pressure of the clean fluid while the valve and the pressure sensor are isolated from the treatment flowline and until the controller causes the actuator to shift back and the valve to close;
isolating the valve and the pressure sensor from the source of clean fluid; and
opening a communication between the valve, the pressure sensor, and the treatment flowline while the valve and the pressure sensor are isolated from the source of clean fluid.

18. The method of claim 17, further comprising filling a portion of the first flowline with the clean fluid, wherein the portion of the first flowline is directly upstream of the valve.

19. The method of claim 17, wherein the junction is further coupled to the source of clean fluid.

20. The method of claim 17, wherein the clean fluid is water.

* * * * *